United States Patent [19]

Nasuno

[11] Patent Number: 5,052,086
[45] Date of Patent: Oct. 1, 1991

[54] CLAMP FOR FIXING PLANT STEM TO SUPPORT WIRE

[76] Inventor: Yasuhiro Nasuno, 469 Kakabocho, Ashikaga-shi, Tochigi-ken, Japan

[21] Appl. No.: 641,513

[22] Filed: Jan. 15, 1991

[51] Int. Cl.$^5$ .................. A01G 17/06; A44B 21/00
[52] U.S. Cl. ........................................ 24/511; 24/489; 24/517; 47/44; 47/47; 248/27.8
[58] Field of Search ................ 24/511, 489, 493, 498, 24/499, 500, 501, 502, 517; 248/27.8; 47/44, 47

[56] References Cited

U.S. PATENT DOCUMENTS

| | | | |
|---|---|---|---|
| 3,096,551 | 7/1963 | Shoberg | 24/501 |
| 3,302,328 | 2/1967 | King | 47/47 |
| 3,309,258 | 3/1967 | Gallo | 248/27.8 |
| 3,456,262 | 7/1969 | Coon | 24/511 |
| 4,745,706 | 5/1988 | Muza et al. | 47/47 |
| 4,881,342 | 11/1989 | Ferguson | 47/47 |

Primary Examiner—Victor N. Sakran
Attorney, Agent, or Firm—Oblon, Spivak, McClelland, Maier & Neustadt

[57] ABSTRACT

A clamp for fixing a plant stem to a support wire includes a movable clamp member, a fixed clamp member, a support shaft and a spring attached to the movable and fixed clamp members. Each of the movable and fixed clamp members has a semicircular beak at its one end and an operating member at its other end. The fixed clamp member has an intermediate body portion provided with a support slot for accommodating an intermediate portion of the movable clamp member. The support shaft pivotally attaches the intermediate portion accommodated in the support slot to the fixed clamp member. The spring applies a biasing force causing the two beaks to close onto each other in the manner of a ring and the two operating members to open in a V-like manner. The body portion is provided with slits extending part way along the floor of the support slot from the beak in the direction of the operating member. A notch opening toward the movable clamp member is provided in the floor of the support slot at the location of the inner end of the slits. A protrusion is provided on the intermediate portion for invading the notch when the two beaks are closed under the force of the spring and withdrawing from the notch when the two beaks are opened by a force overcoming the force of the spring.

2 Claims, 2 Drawing Sheets

CLAMP FOR FIXING PLANT STEM TO SUPPORT WIRE

BACKGROUND OF THE INVENTION

1. Field of the Invention

This invention relates to clamp for fixing an intermediate portion of the stem of a climbing plant such as a cucumber, tomato or melon plant to a suspended support wire and particularly to such a clamp that enables the stem to be fixed by a one-touch action.

2. Description of the Prior Art

The stems of cucumber, tomato, melon and other such plants climb to a considerable height and often become incapable of supporting their own weight, particularly under the added weight of their fruit. For preventing the stems of such plants from bending over it has been the practice to suspend a support wire vertically along the stem and to fix intermediate portions of the stem to the support wire by tying with string or binding with adhesive tape.

As the upper portion of the stem continues to climb, it becomes necessary to carry out the attachment work at regular intervals. The stem grows not only in length but also in diameter so that the string or tape used for attaching the stem to the wire eventually begins to bite into the stem. This constricts the tracheae inside the stem and slows the growth of the plant and the development of its fruit. It is also a cause of stress which leads to deformed fruit. Therefore, it has from time to time been necessary to replace all old pieces of tape or string with new ones of a length proper for the greater stem thickness. The work of fixing the stem to the support wire has thus been very troublesome.

An object of this invention is to provide a clamp which enables fixing of a plant stem to a support wire with a simple, one-touch action and which, moreover, does not require frequent adjustment or reattachment owing to increasing thickness of the stem with plant growth.

SUMMARY OF THE INVENTION

To obtain the above object, according to this invention there is provided a clamp for fixing a plant stem to a support wire, characterized in that a movable clamp member has a semicircular beak at its one end and an operating member at its other end; a fixed clamp member has a semicircular beak at its one end, an operating member at its other end and an intermediate body portion provided with a support slot for accommodating an intermediate portion of the movable clamp member; a support shaft pivotally attaches with respect to the fixed clamp member the intermediate portion of the movable clamp member accommodated in the support slot of the body portion; a spring is attached to the movable clamp member and the fixed clamp member and applies a biasing force causing the beaks of the two clamp members to close onto each other in the manner of a ring and the operating members thereof to open in a V-like manner; the body portion of the fixed clamp member is provided with slits extending part away along the floor of the support slot from the beak of the fixed clamp member in the direction of the operating member; a notch opening toward the movable clamp member is provided in the floor of the support slot at the location of the inner end of the slits; and a protrusion is provided on the intermediate portion of the movable clamp member for invading the notch when the beaks are closed in the manner of a ring under the force of the spring and withdrawing from the notch when the beaks are opened by a force overcoming the force of the spring.

The clamp according to this invention can be used to fix a plant stem to a support wire merely by applying to the clamp member a force sufficient to open the beaks, introducing the stem and the support wire between the opened beaks, introducing the support wire into the slits and then releasing the force applied to the clamp member. The work of fixing stems to support wires can thus be accomplished by one-touch actions, with complete freedom from the troublesome work of tying the stems with strings or binding them with tape.

The above and other objects and features of the invention will become apparent from the following detailed description with reference to the accompanying drawings.

DESCRIPTION OF THE PREFERRED EMBODIMENT

Figure 1:
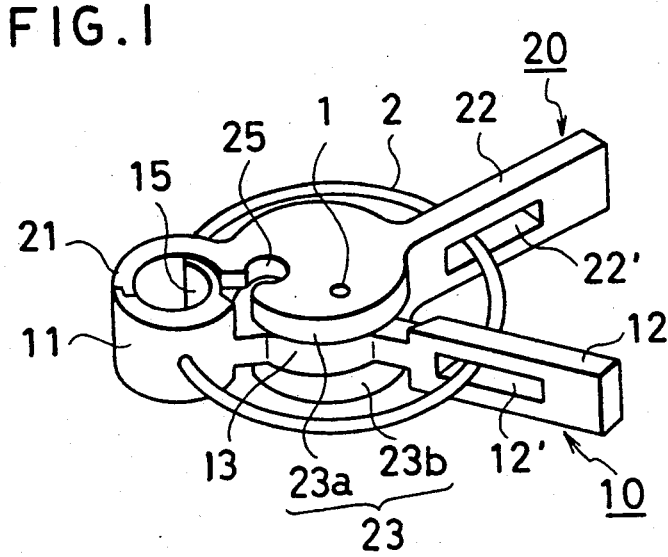
FIG. 1 is a perspective view of a clamp according to this invention.

In the drawings, reference numeral 10 denotes a movable clamp member and 20 a fixed clamp member, both members being formed of plastic.

The movable clamp member and the fixed clamp member are formed at their one ends with semicircular beaks 11 and 21, and at their other ends with operating members 12 and 22. The fixed clamp member 20 has a protruding body portion 23 intermediate thereof. This body portion 23 is provided with a support slot 24 for accommodating an intermediate portion 13 of the movable clamp member 10.

Figure 2:
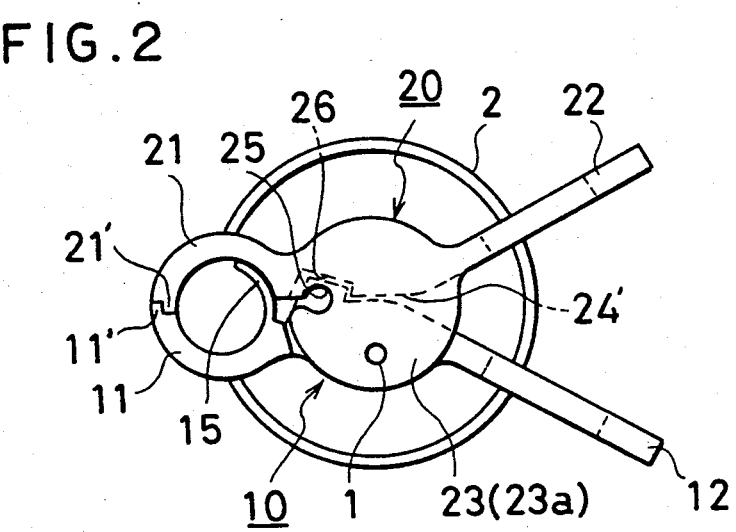
FIG. 2 is a plan view of the clamp.

With the intermediate portion 13 of the movable clamp member 10 inserted into the support slot 24, a support shaft 1 is passed through the upper and lower walls 23a, 23b of the body portion and the intermediate portion 13 positioned therebetween, whereby the movable clamp member is pivotally attached to the fixed clamp member much in the manner of a clothes pin. In the illustrated embodiment, the base portions of the operating members 12, 22 of the movable and fixed clamp members are provided with rectangular holes 12', 22'. The spring 2, which is of the shape of the letter C, passes through the rectangular holes 12', 22' and has its one end in contact with the rear surface of the beak 11 of the movable clamp member and its other end in contact with the rear surface of the beak 21 of the fixed clamp member. The force of the spring 2 causes the beaks 11, 21 at one end of the movable and fixed clamp members to close onto each other in the manner of a ring and causes the operating members 12, 22 at the other end of the clamp members to open in a V-like manner. (See FIGS. 1 and 2). From this closed state, if the operating member 12 of the movable clamp member is pressed by the finger with a force greater than that of the spring 2 so that the operating member 12 moves toward the operating member 22 (in the direction of the arrow in FIG. 3), the movable clamp member 10 will rotate about the support shaft 1, the spring 2 will travel through the rectangular holes relative to the base portions of the operating members 12, 22, and the beak 11 of the movable clamp member will move away from the beak 21 of the fixed clamp member, i.e. the clamp will open.

The upper and lower walls 23a, 23b of the body portion of the fixed clamp member 20 are provided with continuous slits 25 extending part way along the floor 24' of the support slot 24 in the direction of the operating member 22 and the floor 24' of the support slot 24 is formed at the location of the inner end of the slit 25 with a notch 26 opening toward the body portion of the movable clamp member. The intermediate portion 13 of the movable clamp member 10 is further provided at a position opposed to the notch 26 with a protrusion 14 for accommodation in the notch 26.

Figure 3:
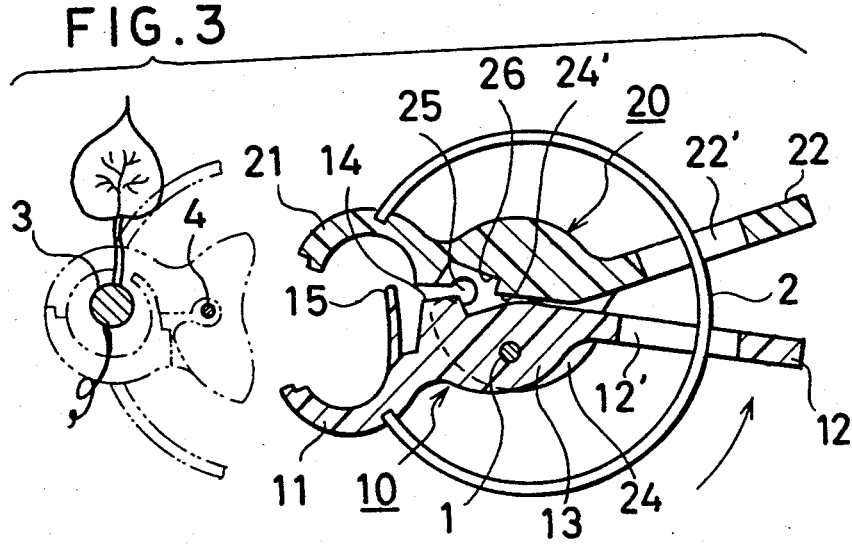
FIG. 3 is a sectional view of the clamp, showing it opened for use in fixing a plant stem.
Figure 4:
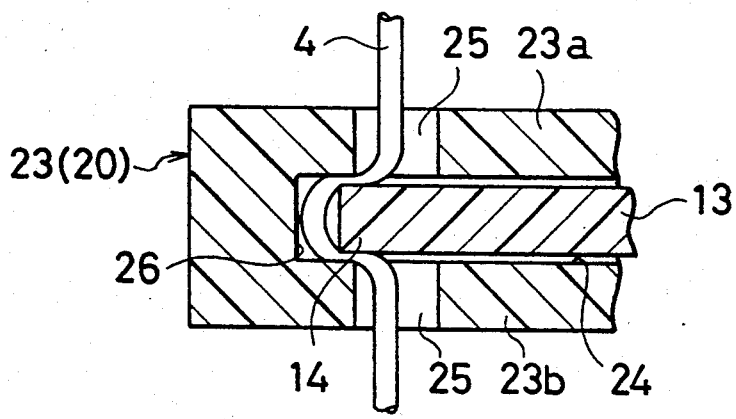
FIG. 4 is an enlarged sectional view showing the state in which a support wire is clamped when the clamp is used to fix a plant stem.
Figure 5:
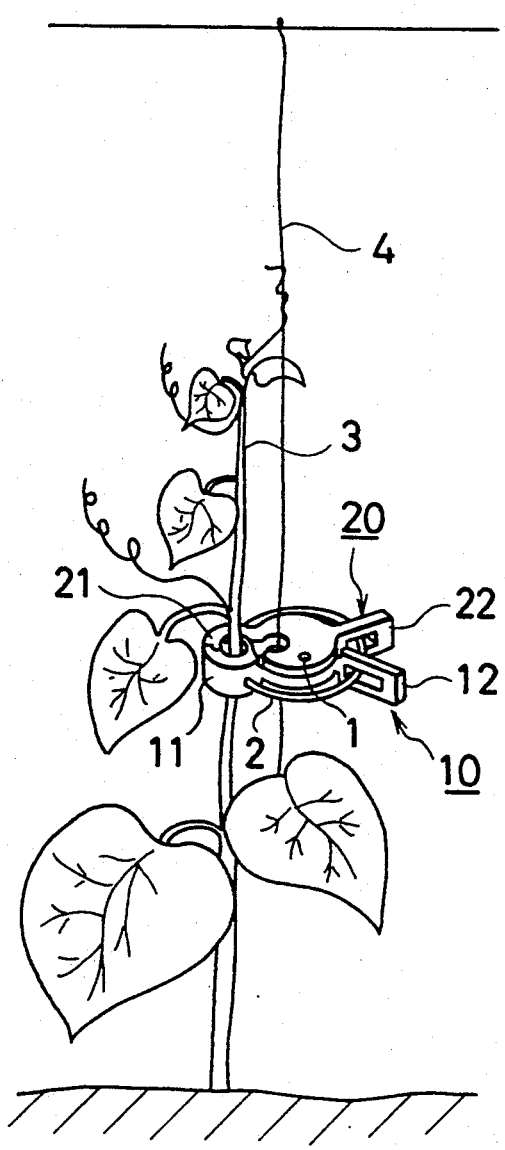
FIG. 5 is a view for explaining how the clamp is used.

When the beaks 11, 21 of the movable and fixed clamp members are brought into abutment in a ring-like manner by the force of the spring 2 as was described earlier, the protrusion 14 provided on the intermediate portion 13 invades the notch 26 of the fixed clamp member and blocks the continuous slits 25 formed in the upper and lower walls 23a, 23b of the body portion 23 (FIG. 4). On the other hand, when the movable clamp member is rotated by a force overcoming the force of the spring 2 so as to separate the beak 11 of the movable clamp member from the beak 21 of the fixed clamp member, the protrusion 14 withdraws from the notch 26 (FIG. 3).

When the clamp according to this invention is used, the movable clamp member is first rotated by using the fingers to apply thereto a force greater than the force of the spring 2. The clamp in this state is then moved so as to pass a plant stem 3 and a support wire 4 between the beaks 11, 21 and cause the support wire 4 to pass to the inner end of the slits 25 (see chain line illustration in FIG. 3). The force applied to the movable clamp member 10 is then released so that the movable clamp member 10 is rotated in the opposite direction by force of the spring 2, causing the beaks 11, 21 of the clamp members 10, 20 to abut in the manner of a ring. By this operation, the stem 3 is captured in the open space within the ring and the protrusion 14 invades the notch 26 of the fixed clamp member to bend the support wire 4 in a crank-like manner as shown in FIG. 4 and thus clamp the support wire 4 between the protrusion 14 and the floor of the notch 26. Therefore, by attaching the clamp at a desired height of the support wire 4, it becomes possible to fix and support an intermediate portion of the stem 3 with respect to the support wire. Since the support wire 4 is bent in a crank-like manner, no slippage occurs between the clamp and the wire.

Optionally, a shield 15 can be provided on the movable clamp member 10 so as to prevent the stem 3 from entering the slits 25 at the time the stem 3 and the support wire 4 are introduced between the opened beaks 11, 21 and support wire 4 is further introduced into the slits 25. It is also possible to provide the tips of the beaks 11, 21 with steps 11', 21' which mesh with each other when the beaks 11, 21 abut in the manner of a ring.

The beaks 11, 21 need only be capable of loosely capturing the stem 3 within the inner space they define at the time of abutment. It is therefore not essential for them to be of semicircular shape and beaks of semielliptical or U-shape can be used instead.

The clamp according to this invention can be used to fix a plant stem to a support wire merely by applying to the clamp member 10 a force sufficient to open the beaks 11, 21, introducing the stem 3 and the support wire 4 between the opened beaks, introducing the support wire into the slits 25 and then releasing the force applied to the clamp member 10. The work of fixing stems to support wires can thus be accomplished by one-touch actions, with complete freedom from the troublesome work of tying the stems with strings or binding them with tape.

Moreover, since the stem 3 is captured in the space formed by closing the beaks 11, 21 onto each other, the plant can be allowed to grow until its stem has taken up all space available within the ring. When this happens, all that need be done is to move the clamp to a slightly higher position where the stem is somewhat thinner. As this can also be done by a one-touch action, no need arises for cutting and redoing string or tape bindings. The work is thus easier and less wasteful.

What is claimed is:

1. A clamp for fixing a plant stem to a support wire, comprising:
    a movable clamp member having a semicircular beak at its one end and an operating member at its other end;
    a fixed clamp member having a semicircular beak at its one end, an operating member at its other end and an intermediate body portion provided with a support slot for accommodating an intermediate portion of the movable clamp member;
    a support shaft for pivotally attaching with respect to the fixed clamp member the intermediate portion of the movable clamp member accommodated in the support slot of the body portion;
    a spring attached to the movable clamp member and the fixed clamp member and applying a biasing force causing the beaks of the two clamp members to close onto each other in the manner of a ring and the operating members thereof to open in a V-like manner;
    the body portion of the fixed clamp member being provided with slits extending part way along the floor of the support slot from the beak of the fixed clamp member in the direction of the operating member;
    the floor of the support slot being provided at the location of the inner end of the slits with a notch opening toward the movable clamp member; and
    a protrusion being provided on the intermediate portion of the movable clamp member for invading the notch when the beaks are closed in the manner of a ring under the force of the spring and withdrawing from the notch when the beaks are opened by a force overcoming the force of the spring.

2. A clamp according to claim 1, wherein said semicircular beak of said movable clamp member has a base end provided with a shield for preventing the stem from entering said slits.

* * * * *